(12) United States Patent
Vezzetti et al.

(10) Patent No.: US 9,560,335 B2
(45) Date of Patent: Jan. 31, 2017

(54) DEVICE AND SYSTEM FOR THREE-DIMENSIONAL SCANNING, AND METHOD THEREOF

(71) Applicant: POLITECNICO DI TORINO, Turin (TO) (IT)

(72) Inventors: Enrico Vezzetti, Salassa (IT); Daniel Grivon, Montjovet (IT); Rayant Kenneth Braul De Leon, Verres (IT); Gilmar Estuardo Fuentes Bravo, Ivrea (IT); Vincenzo Marino, Militello Rosmarino (IT); Sandro Moos, Meana di Susa (IT)

(73) Assignee: S.I.SV.EL. S.P.A., None (TO) (IT)

( * ) Notice: Subject to any disclaimer, the term of this patent is extended or adjusted under 35 U.S.C. 154(b) by 0 days.

(21) Appl. No.: 14/777,389

(22) PCT Filed: Mar. 12, 2014

(86) PCT No.: PCT/IB2014/059682
§ 371 (c)(1),
(2) Date: Sep. 15, 2015

(87) PCT Pub. No.: WO2014/141095
PCT Pub. Date: Sep. 18, 2014

(65) Prior Publication Data
US 2016/0065932 A1    Mar. 3, 2016

(30) Foreign Application Priority Data
Mar. 15, 2013  (IT) .............................. TO2013A0202

(51) Int. Cl.
*G06F 3/12*   (2006.01)
*H04N 13/00*  (2006.01)
(Continued)

(52) U.S. Cl.
CPC .......... *H04N 13/0022* (2013.01); *G01B 21/20* (2013.01); *G01S 17/023* (2013.01);
(Continued)

(58) Field of Classification Search
CPC .............. A63F 2300/1093; G06F 3/017; G06F 19/3406; G06F 19/3418; G06F 19/345; G06T 2207/30196; G06T 7/20; H04N 13/0271; H04N 13/0468; A61B 5/1115
(Continued)

(56) References Cited

U.S. PATENT DOCUMENTS 5,886,775 A * 3/1999 Houser .................. G01S 5/0247
                                                    356/4.01
5,969,822 A * 10/1999 Fright ................ G01B 11/2522
                                                    356/608
(Continued)

FOREIGN PATENT DOCUMENTS

| EP | 2 511 656 A1 | 10/2012 |
| GB | 2 328 280 A | 2/1999 |
| WO | 2007/030026 A1 | 3/2007 |

OTHER PUBLICATIONS

International Preliminary Report on Patentability dated Sep. 15, 2015, issued in PCT Application No. PCT/IB2014/059682, filed Mar. 12, 2014.
(Continued)

*Primary Examiner* — Negussie Worku
(74) *Attorney, Agent, or Firm* — Workman Nydegger (57) ABSTRACT

A device for three-dimensional scanning of an object includes a detector adapted to obtain orientation information of the device, optics adapted to obtain planar information about a position of the device in a first reference plane of the optics, and a processor adapted to acquire the orientation information and the planar information from the detector
(Continued)

and from the optics, respectively, and to process such information in order to obtain an estimate of a position of the device on an axis substantially perpendicular to the first reference plane, for the purpose of obtaining a three-dimensional image of the object.

28 Claims, 6 Drawing Sheets (51) Int. Cl.
    *G01B 21/20* (2006.01)
    *G01S 17/42* (2006.01)
    *G06F 3/0346* (2013.01)
    *G01S 17/02* (2006.01)
    *H04N 13/02* (2006.01)
    *G01S 17/89* (2006.01)

(52) U.S. Cl.
    CPC ............ *G01S 17/42* (2013.01); *G06F 3/0346* (2013.01); *H04N 13/0253* (2013.01); *G01S 17/89* (2013.01)

(58) Field of Classification Search
    USPC ... 345/158; 382/103, 154; 600/300; 700/253
    See application file for complete search history.

(56) References Cited

U.S. PATENT DOCUMENTS

| | | | | |
|---|---|---|---|---|
| 7,187,401 B2* | 3/2007 | Alhadef | ................ | G01C 11/06 348/42 |
| 8,068,121 B2* | 11/2011 | Williamson | .......... | G06F 1/1626 345/619 |
| 8,385,683 B2* | 2/2013 | Lin | ....................... | G01C 15/002 348/43 |
| 8,517,834 B2* | 8/2013 | Krzeslo | ................... | A63F 13/10 463/36 |
| 8,542,186 B2* | 9/2013 | Alameh | ................ | G06F 1/1694 324/115 |
| 8,625,854 B2* | 1/2014 | Valkenburg | .......... | G01B 11/002 382/106 |
| 8,849,036 B2* | 9/2014 | Shin | ..................... | G05D 1/0246 382/153 |
| 8,902,308 B2* | 12/2014 | Rinner | .................. | G06T 7/0028 348/117 |
| 8,929,176 B2* | 1/2015 | Debrunner | ............. | H04B 11/00 367/134 |
| 9,201,568 B2* | 12/2015 | Chavez | ................... | G06F 3/012 |
| 9,274,597 B1* | 3/2016 | Karakotsios | ............ | G06F 3/012 |
| 2002/0041282 A1 | 4/2002 | Kitaguchi et al. | | |
| 2009/0208358 A1* | 8/2009 | Yamashita | ................ | F04C 2/18 418/205 |
| 2012/0146902 A1* | 6/2012 | Adermann | .............. | G06F 3/017 345/158 |
| 2014/0046589 A1 | 2/2014 | Metzler et al. | | |

OTHER PUBLICATIONS

International Search Report and Written Opinion dated May 22, 2014, issued in PCT Application No. PCT/IB2014/059682, filed Mar. 12, 2014.

* cited by examiner

DEVICE AND SYSTEM FOR THREE-DIMENSIONAL SCANNING, AND METHOD THEREOF

BACKGROUND OF THE INVENTION

1. Field of the Invention

The present invention relates to a device, a system and a method for three-dimensional scanning, more particularly for three-dimensional, or 3D, detection of physical objects of any geometry.

2. Present State of the Art

It is known that many measuring instruments exist which can copy, or replicate, the three-dimensional outline of a real object having a complex shape. These instruments are called "3D scanners" and are employed for industrial design, quality control, biomedical and other applications where digital copies of real objects are needed. Such systems may require the use of different technologies, each having specific limits, advantages and costs. According to a well-known and established classification, they are divided into two macrofamilies: "contact" systems and "contactless" systems.

"Contact" 3D scanning systems probe the external surface of the object by physical contact. The structure of these systems may include a rigid-arm transport system allowing the scanning head to move along the axes of the coordinates, e.g., Cartesian ones, or, more commonly, may include articulated arms fitted with joint-mounted displacement sensors which can detect the movements of a measuring head (also called "feeler").

However, such "contact" systems with rigid or articulated arms are very bulky and difficult to move. As a matter of fact, they are totally inadequate for 3D scanning, or detection, of objects that cannot be moved from their original location, e.g., archeological finds.

As far as "contactless" systems are concerned, they employ optical systems making use of a light source (laser, light pattern and the like), and represent the most widespread solution currently available on the market. Among these, so-called "hand-held" scanners are now becoming more and more popular on the market, which use measuring-head tracking stations or place reference markers on the object itself or in the surrounding environment. These expedients are normally resorted to because the object cannot be wholly scanned by means of just one measurement, and multiple measuring steps have to be carried out. In order to ensure consistency of the results obtained by means of the various measurements, it is necessary to use common reference elements, e.g., markers, for all measurements, so as to define a univocal reference system.

However, these latter "contactless" systems using references, or markers, require post-processing operations for merging all the single measurements taken, i.e., an operator aligning and joining the single measurements. Moreover, the accuracy of the measurements is strictly dependent on the positions and quantity of the markers placed on the object. This factor introduces measurement errors that propagate into the final result, i.e., the full processing of the 3D model of the object under examination.

SUMMARY OF THE INVENTION

It is therefore one object of the present invention to provide a device, a system and a method for three-dimensional scanning which allow acquiring the whole shape of the object without requiring any subsequent steps for merging the single measurements.

It is a second object of the present invention to provide a device, a system and a method for three-dimensional scanning which allow to easily make a three-dimensional detection of an object directly on the spot where the object itself is located.

It is a third object of the present invention to provide a device, a system and a method for three-dimensional scanning which are not dependent on the positions and quantity of references, or markers, present on the object under examination, thus remaining independent of the accuracy of the measurements of such references.

These and other objects of the invention are achieved by a device, a system and a method for three-dimensional scanning as claimed in the appended claims, which are intended to be an integral part of the present description.

In short, the following will describe a device, a system and a method for three-dimensional scanning which exploit information about the position of the device relative to a reference plane, obtained by means of optical sensors, and information about the orientation of the device, in particular roll, pitch and yaw data, obtained by means of inertial and magnetometric sensors; such information is processed by a microprocessor in order to obtain a position of the device on a perpendicular axis, for the purpose of obtaining a three-dimensional image of an object being detected, or scanned, by said device.

Further features of the invention are set out in the appended claims, which are intended to be an integral part of the present description.

BRIEF DESCRIPTION OF THE DRAWINGS

The above objects will become more apparent from the following detailed description of a device, a system and a method for three-dimensional scanning according to the present invention, with particular reference to the annexed drawings, wherein.

DETAILED DESCRIPTION OF THE PREFERRED EMBODIMENTS

Figure 1:
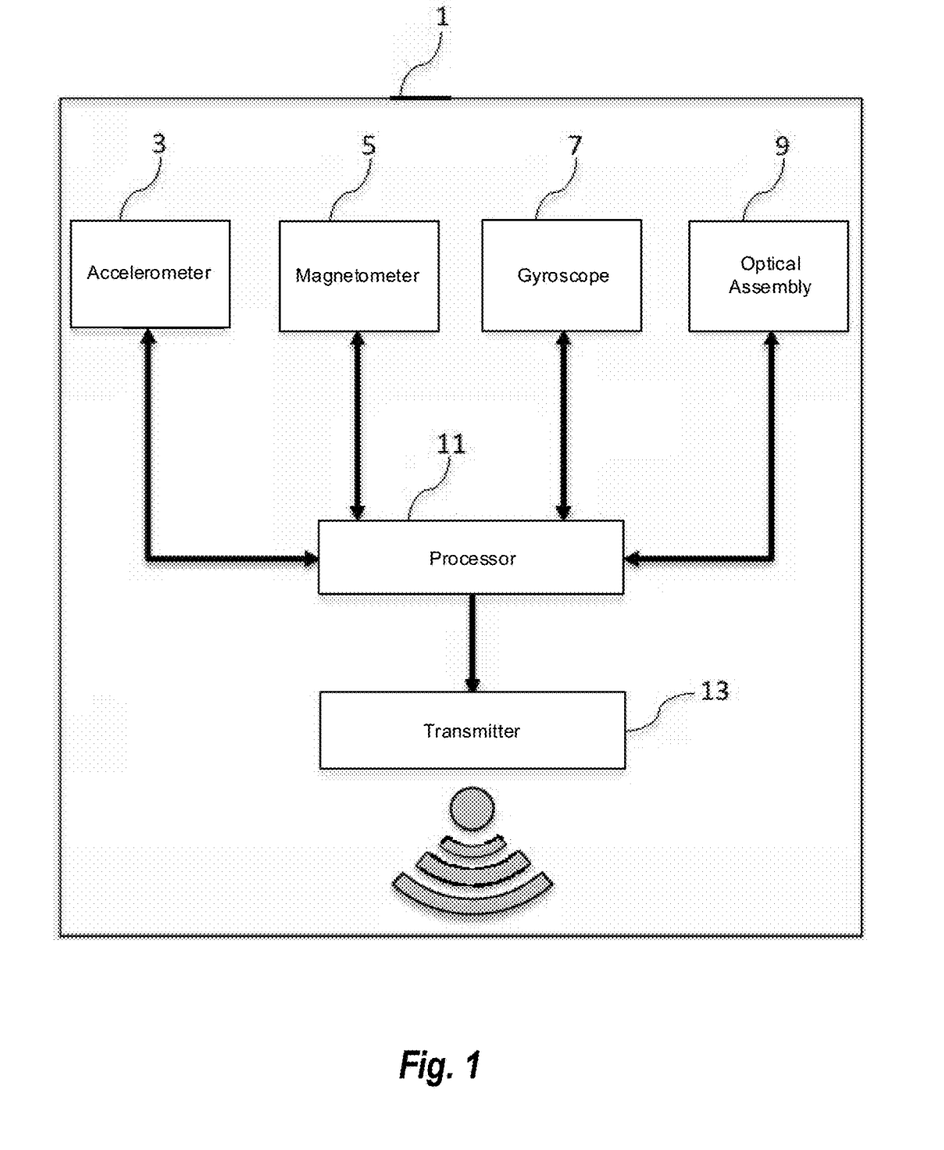
FIG. 1 shows an embodiment of a 3D scanning device according to the present invention.

With reference to FIG. 1, a device 1 for three-dimensional, or 3D, scanning of an object according to the present invention is of the manual type and comprises detection means 3,5,7 adapted to provide orientation information of the device 1. The detection means 3,5,7 comprise at least one inertial and/or magnetometric sensor, in particular an accelerometer 3 with three orthogonal sensitivity axes, a magnetometer 5 with three orthogonal sensitivity axes, and a gyroscope 7 with three orthogonal sensitivity axes. More in detail, the accelerometer 3 allows measuring both dynamic components, or variations, and continuous, or static, components of acceleration. The magnetometer 5 can measure the direction, versus and intensity of a magnetic field in which it is immersed. The gyroscope 7 allows detecting its own angular rotation speed.

The orientation information comprises data about a roll, a pitch and a yaw of the device 1.

In addition, the three-dimensional scanning device 1 comprises optical means 9 adapted to provide planar information. The optical means 9 comprise optical sensors, a LED ("Light Emitting Diode"), an optical lens, a camera, and the like.

The detection means 3,5,7 and the optical means 9 comprise each storage means adapted to store data relating to the orientation information and to the planar information.

In a preferred embodiment, the optical means 9 comprise an optical sensor having two orthogonal sensitivity axes, which can detect position variations, or displacements, on two dimensions (planar or two-dimensional) by comparing homologous points of two successively acquired frames.

The planar information comprises, therefore, data about a position of the device 1 in a first reference plane of the optical means 9, wherein such data can be expressed, for example, through Cartesian or polar coordinates.

The single datum of the planar information may correspond to a vector of values, e.g., identifying the coordinates (x, y, 0) of the first reference plane.

The device 1 further comprises processing means 11 adapted to process the orientation information and the planar information coming from the detection means 3,5,7 and from the optical means 9, respectively. The processing means 11 consist, for example, of a microcontroller or a microprocessor.

The processing means 11 can directly access to the detection means 3,5,7 and to the optical means 9, and hence to their respective storage means, which store the data relating to the orientation and planar information.

Preferably, the processing means 11 carry out the following main steps:
- a step of programming the detection means 3,5,7 and the optical means 9, wherein the storage means of the detection means 3,5,7 and of the optical means 9 are programmed in order to define operating characteristics thereof; for example, this step defines and programs a sensitivity scale, a sampling period, a transmission speed towards the processing means 11, and so on;
- an acquisition step, wherein the processing means 11 acquire, at each sampling period, the planar information and the orientation information contained in said storage means.

The processing means 11 also convert the binary values contained in the storage means into "floating point" values;
- a step of routing the planar information and the orientation information towards transmission means 13.

Figure 2:
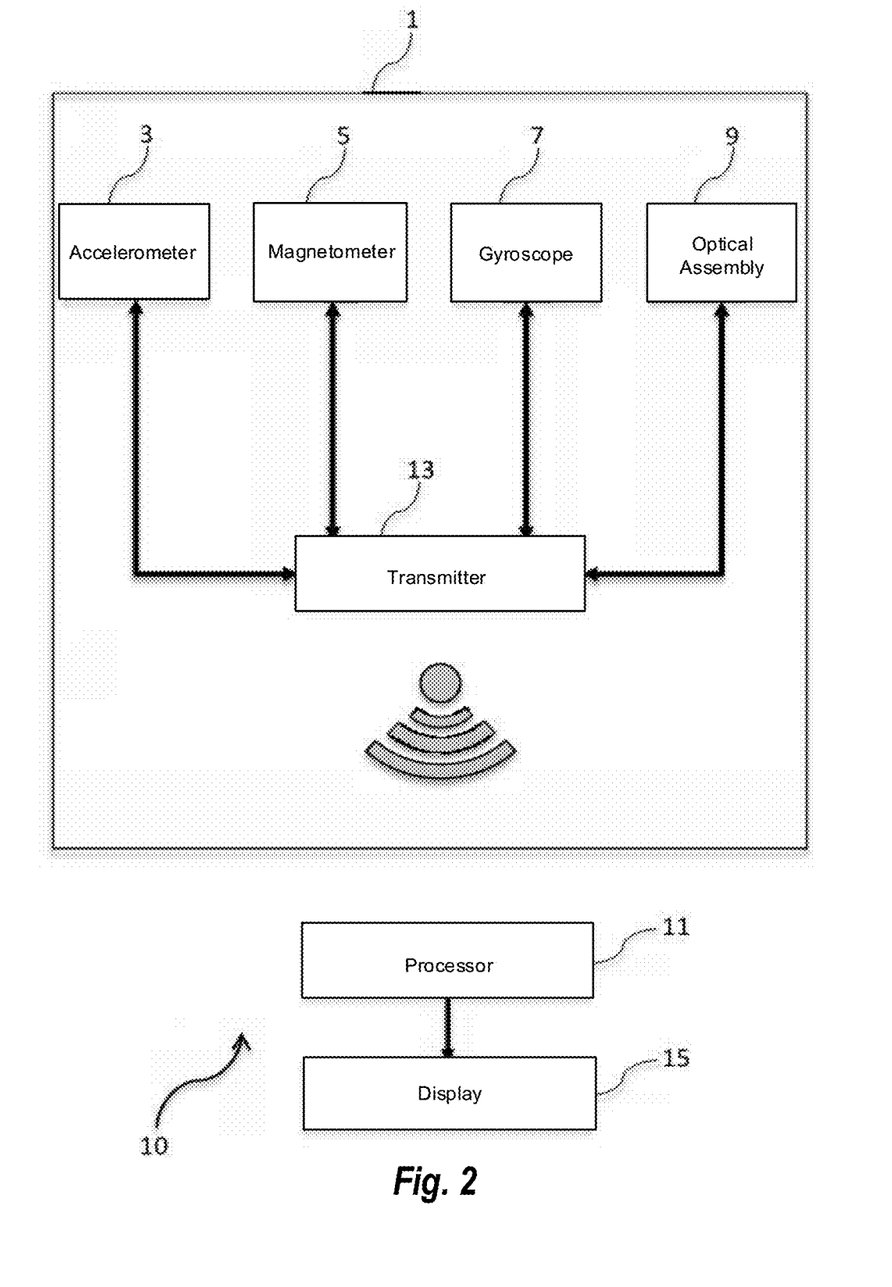
FIG. 2 shows an embodiment of a 3D scanning system according to the present invention.

With reference to FIG. 2, a system 10 comprises the three-dimensional scanning device 1, the processing means 11 and display means 15. Advantageously, the device 1 comprises transmission means 13, in particular of the wired or wireless type, adapted to transmit the orientation information and the planar information to the processing means 11.

In a preferred embodiment of the transmission means 13, they consist, for example, of a Bluetooth transmission sensor that sends the data of the planar information and of the orientation information to the processing means 11. In this case, the processing means 11 consist of a computer, in particular adapted to receive and process said information transmitted by the transmission means 13.

The orientation information and the planar information are thus used by the processing means 11 in order to obtain a three-dimensional image of an object under examination. In the system 10, the processing means 11 are not comprised in the device 1, but are external thereto. The processing means 11 then supply the data relating to the three-dimensional image to the display means 15, in particular a screen or a monitor, whereon the same can be displayed.

It is clear that the detection means 3,5,7, the optical means 9, the processing means 11, the transmission means 13 and the display means 15 may be all comprised in a single device.

Figure 3:
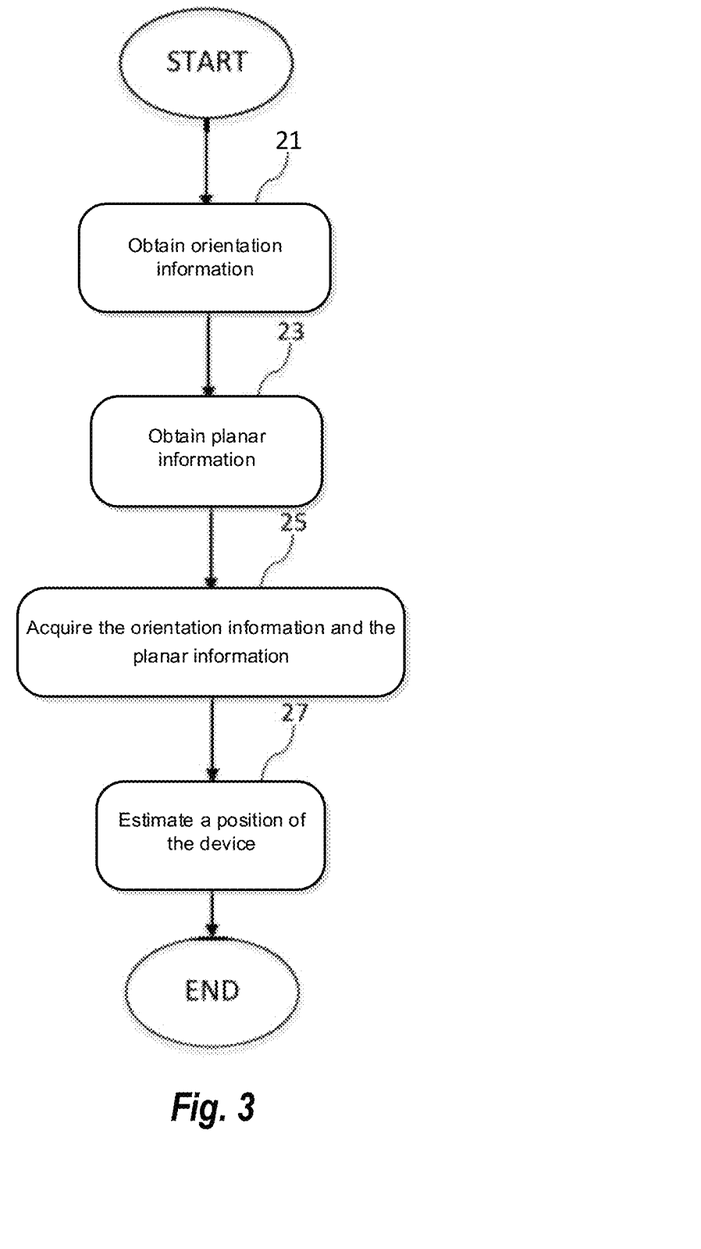
FIGS. 3 to 6 show a first, a second, a third and a fourth flow charts, respectively, of the method according to the present invention.

With reference to FIG. 3, the method of three-dimensional scanning of an object according to the present invention provides, at step 21, for obtaining, through detection means 3,5,7, orientation information of a device 1; then, at step 23, it provides for obtaining, through optical means 9, planar information about a position of the device 1 in a first reference plane of the optical means 9.

Subsequently, at step 25, the method provides for acquiring, through processing means 11, the orientation information and the planar information from the detection means 3,5,7 and from the optical means 9, respectively; finally, at step 27, the method provides for processing, through processing means 11, the orientation information and the planar information in order to obtain an estimate of a position of the device 1 on an axis substantially perpendicular to the first reference plane, for the purpose of obtaining a three-dimensional image of said object under examination.

Figure 4:
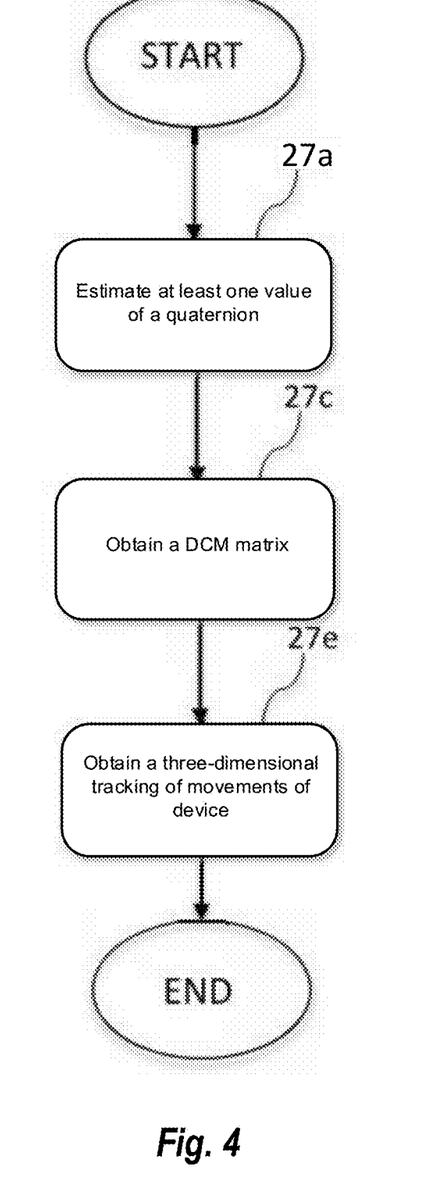

More in detail, with reference to FIG. 4, the step 27 just described comprises further sub-steps, wherein at 27a it is estimated, through the processing means 11, at least one value of a quaternion, representative of the orientation information, by using a least square method, particularly the Gauss-Newton method; step 27c provides for filtering, by using a recursive filter, e.g. an extended Kalman filter, the result of step 27a (estimate of at least one value of a quaternion) and/or at least one quaternion deriving from the measurements of the orientation information taken by the gyroscope 7; also this filtering operation is carried out by the processing means 11.

The result of step 27c is a DCM matrix (Direction Cosine Matrix), obtained from the values of said quaternions. It should be specified that quaternions are mathematical entities through which it is possible to represent an estimate of the orientation of the device 1, i.e., they represent the orientation information.

Finally, at step 27e it is possible to obtain a three-dimensional tracking of the movements of the device 1 by rotating at least one vector of the planar information, e.g., a vector of the (x, y, 0) type, acquired by the optical means 9, or by multiplying at least one data vector of the planar information by the DCM matrix. Also this last step 27e is carried out by the processing means 11.

The method according to the present invention may further include a number of optional steps that allow aligning at least one second reference plane of the detection means 3,5,7 with respect to the first reference plane of the optical means 9, as well as calibrating and compensating for any distortion/non-linearity in the measurements taken by the detection means 3,5,7 and by the optical means 9.

These two procedures are very useful because they allow to increase the accuracy of the three-dimensional measurement of the object's outline.

Figure 5:
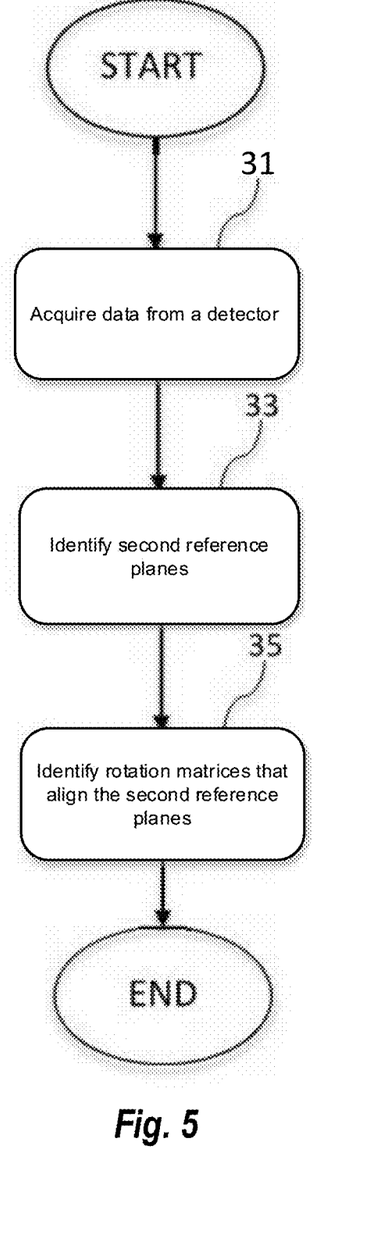

With reference to FIG. 5, the procedure for aligning at least one second reference plane of the detection means 3,5,7 with respect to the first reference plane of the optical means 9 is divided into three steps:
- at step 31, an acquisition is made of the data supplied by the detection means 3,5,7 when the device 1 is rotated at least once about an axis substantially perpendicular to the first reference plane of the optical means 9. In other words, this means that the rotation must occur while keeping the first reference plane of the optical means 9 always coincident with a fixed third reference plane. In order to facilitate the next steps, this operation may be executed by using an inclined plane as a third reference plane. The data thus acquired draw a circumference in the reference space of each detection means 3,5,7;

step 33 identifies at least one second reference plane containing the circumference obtained from at least one rotation and defined for each detection means 3,5,7 during the previous step 31. Since the acquired data are not filtered and contain measurement noise, the second plane which is identified for each circumference is defined as the plane that best approximates the distribution of the samples of each detection means 3,5,7. The operations of step 33 are carried out by the processing means 11;

step 35 identifies, through the processing means 11, rotation matrices (representing the rotations for the roll and pitch angles) which align the second reference planes, defined at step 33 for each detection means 3,5,7, with respect to the first reference plane of the optical means 9.

The final result of this alignment algorithm is a direction cosine matrix, or DCM, for each detection means 3,5,7, which defines the two elementary rotations about two axes that define the second reference plane. Thus, the second reference plane of each detection means 3,5,7 is aligned with the first reference plane of the optical means 9. Finally, in order to correct the misalignment between the second planes of the different detection means 3,5,7, it is sufficient to multiply each acquired sample (made up of three components, which can be represented, for example, by means of Cartesian values) by the DCM alignment matrix of the respective detection means 3,5,7.

Figure 6:
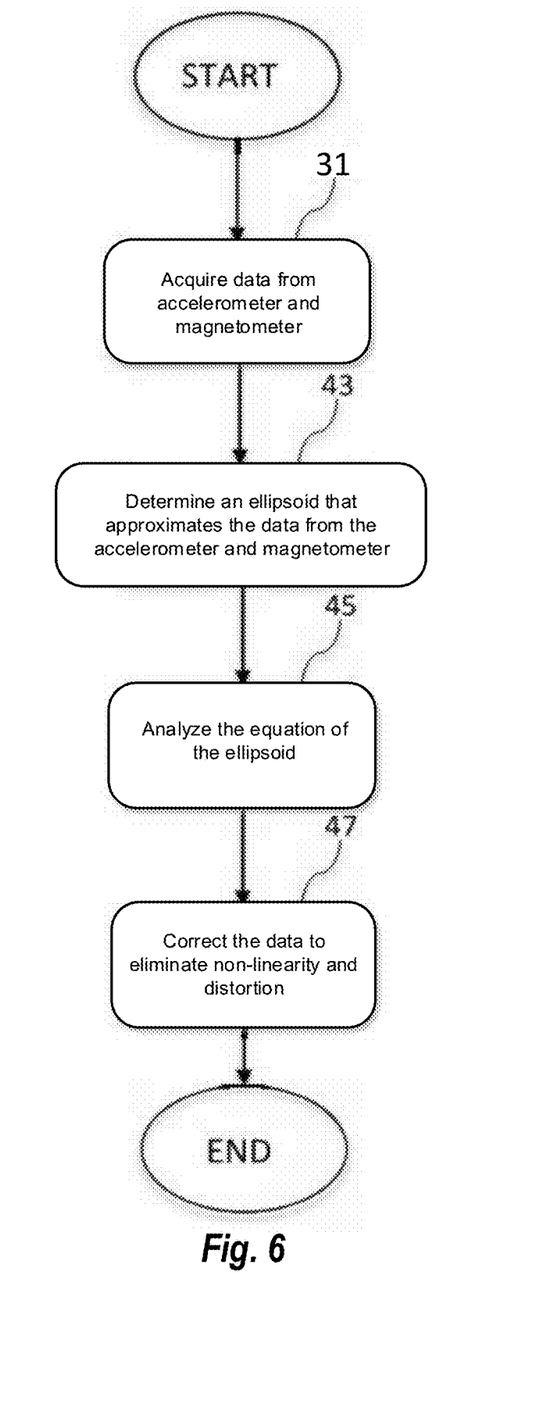

With reference to FIG. 6, the procedure for calibrating and correcting any distortion/non-linearity pertaining to the accelerometer 3 and the magnetometer 5 comprises the following steps:

at step 41, acquiring, through the processing means 11, the data supplied by the accelerometer 3 and by the magnetometer 5 when said device 1 is rotated. This operation allows finding the largest number of different positions in the arrangement of the device 1. This is equivalent to freely rotating the device 1 in such a way as to obtain a large number (ideally all) of different combinations of the roll, pitch and yaw angles that define the arrangement of the device 1. The acquired data are processed by the processing means 11 and allow the latter to draw a three-dimensional solid in the reference space of each detection means 3,5, which can be approximated by an ellipsoid;

at step 43, determining (i.e., obtaining the characteristic equation in matrix form), through the processing means 11, the ellipsoid which best approximates the three-dimensional distribution of the data sampled for both the accelerometer 3 and the magnetometer 5;

at step 45, analyzing, through the processing means 11, the equation of the best approximating ellipsoid defined at the previous step 43, in order to find its constituent parameters, i.e.:

a. Coordinates ($x_c$, $y_c$, $z_c$) of the center of the best approximating ellipsoid, translated with respect to the origin (0, 0, 0) of the reference system of the detection means 3 or 5;

b. Rotation matrix that provides the alignment of the best approximating ellipsoid, i.e., the alignment of the axes of symmetry thereof, with the reference system of the detection means 3 or 5 being considered. The columns of the rotation matrix consist of the self-vectors determined by starting from the characteristic matrix equation of the best approximating ellipsoid with its center at the origin of the reference system of the detection means 3 or 5 being considered;

c. Lengths of the half-axes of the best approximating ellipsoid; these values are obtained from the self-vectors of the characteristic equation of the best approximating ellipsoid, defined in matrix form;

at step 47, an operation is carried out for correcting the raw data acquired by the detection means 3 or 5, in order to eliminate any non-linearity and distortion; this operation is performed by the processing means 11. In order to correct each acquired sample (made up of three components), it is preferable to:

a. Correct an offset according to the data obtained at step 45a, which define the coordinates ($x_c$, $y_c$, $z_c$) of the center of the best approximating ellipsoid, translated with respect to the reference system of the detection means 3 or 5;

b. Rotate the sample, or multiply it by the rotation matrix obtained at step 45b;

c. Normalize, or correct, each sample by dividing each component of the sample itself by the length of the respective reference half-axis in accordance with a first formula 50:

$$x_{corr.} = x_{uncorr.}/\text{length of half-axis } x \qquad (50);$$

d. Restore the initial orientation of the normalized sample by multiplying it by the inverse of the rotation matrix of step 43b.

The final result, obtained by applying this procedure to the data sampled in accordance with the procedure defined at step 41, is that the different samples approximate with a high degree of accuracy a unitary sphere (unitary because the data have been normalized at step 47c) in the reference space of the respective detection means 3 or 5, thus describing the ideal situation wherein the detection means 3,5 are not subject to any distortion. For precise calibration and correction, it is preferable that step 47 is repeated for each new sample acquired.

Referring back to FIG. 4, the following will describe more in detail steps 27a, 27c and 27e.

As aforesaid, the processing means 11 process the three-dimensional tracking of the movements of the device 1 by rotating the planar information, which can be represented as a vector of three Cartesian components (x, y, 0) acquired by the optical means 9, i.e., by multiplying a data vector of the planar information by the DCM rotation matrix obtained by processing the orientation information derived from the detection means 3,5,7. In particular, said DCM matrix is obtained from an algorithm estimating the orientation of the device 1.

The orientation estimation algorithm has the function of determining the orientation taken by the device 1 with respect to an initial reference position. The data processed by the algorithm may be data which have been aligned and compensated as previously discussed in regard to the alignment of the second planes of the detection means 3,5,7 and to distortion/non-linearity calibration and compensation.

The orientation estimation algorithm specifically utilizes a least square method for estimating the quaternions, in particular the Gauss-Newton method.

The Gauss-Newton method is used in its classic formulation for solving the non-linear problem and determining the components of the quaternions.

In particular, the problem to be solved is defined by a 6×6 matrix containing two 3×3 rotation matrices made explicit in the components of the quaternions. These two matrices rotate the vectors of the fixed quantities in the reference system (e.g., magnetic field and gravity acceleration) to reproduce them in the reference system of the rotated device 1. In this manner, knowing the fixed reference quantities and the measurements of the accelerometer 3 and magnetometer 5, the problem is reduced to calculating the components of the matrices (which contain the components of the quaternions). Therefore, by multiplying the reference quantities by the matrix thus obtained, one obtains the measurements of the accelerometer 3 and magnetometer 5.

As far as the gyroscope 7 is concerned, it is used for providing orientation information. In particular, it is important to estimate the components of the quaternions starting from the data supplied by the gyroscope 7, i.e., from its measurements.

Consequently, it is possible to obtain an estimation of the quaternions by starting from the simple relation according to which, knowing the quaternion at step k, where k is an integer number, one can calculate the quaternion q at the next step k+1 according to a second formula (51);

$$q_{k+1} = \frac{1}{2}\omega_k \circ q_k = \frac{1}{2}\begin{pmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{pmatrix}\begin{pmatrix} q_0 \\ q_1 \\ q_2 \\ q_3 \end{pmatrix} \quad (51)$$

where $\omega_x$, $\omega_y$, and $\omega_z$ are the angular speeds on the three reference axes XYZ measured by the gyroscope 7.

According to the orientation estimation algorithm, furthermore, the data supplied by the detection means 3,5,7 pass through a recursive filter, in particular an extended Kalman filter.

The extended Kalman filter is used in its common form:
the state vector of said filter is represented by the vector containing the components of the quaternion estimated by starting from the measurements of the gyroscope 7 and representing the a priori estimate; in other words, it is the orientation information obtained from the gyroscope 7;
the measurement vector of said filter is represented by the vector containing the components of the quaternion solved by using the Gauss-Newton method; in other words, it is the orientation information obtained from the accelerometer 3 and magnetometer 5.

State and measurement noise can be expressed through covariance matrices, in particular diagonal matrices, the values of which are set empirically.

There is also a mechanism for adapting the values of a measurement covariance matrix in a manner such that, if an error function F(x) of the Gauss-Newton method has very high values (which indicates inconsistency between the measurements of the accelerometer 3 and of the magnetometer 5), the elements of the diagonal of the measurement covariance matrix will be set to very high values (tending to infinity), i.e., to indicate that the information provided by the Gauss-Newton method is not reliable.

The final result of this orientation estimation algorithm is a quaternion that represents an optimal estimate of the orientation of the device 1, representing the orientation information obtained from the detection means 3,5,7. Said quaternion can be easily converted into a matrix notation to constitute the direction cosine matrix DCM of the device 1.

The orientation, and hence the orientation information, being known, it is possible to obtain a three-dimensional tracking of the movements of the device 1 by rotating the planar information supplied by the optical means 9; in other words, by multiplying the displacement vector (x, y, 0) acquired by the optical means 9 by the direction cosine matrix DCM obtained by the orientation estimation algorithm.

It must be underlined that the orientation information obtained from the gyroscope 7 alone, combined with the planar information from the optical means 9, would be sufficient to obtain the three-dimensional image, but only if the orientation information were not subject to any noise or drift phenomena. As a matter of fact, the intrinsic drift that affects all gyroscopes 7 (especially low-cost ones) makes them not very reliable when used alone. Even for short acquisition sessions, the error produced will be such that measurements will be inconsistent.

In addition to the above, it is possible to establish an overall sampling frequency of the device 1 or of the system 10. Considering that the above-mentioned operations carried out by the processing means 11, which determine the full three-dimensional tracking of the device 1, are cyclical, one can consider, as an overall sampling frequency, the inverse of the average time interval (or period) in which a full calculation cycle takes place, in accordance with a third formula 52:

$$F_{samp}=1/T_{samp}=1/32 \text{ ms}=31.25 \text{ Hz} \quad (52)$$

A user can thus use the device 1 of the present invention in a simple and intuitive manner. In fact, the above-mentioned elements comprised in the device 1 are small and allow the instrument to be easily carried and used.

The device 1 must be used as follows: a user slides it on the acquisition surface, preferably such that the first reference plane of the optical means 9 remains constantly in contact with and tangential to the acquisition surface. Any starting position is allowed, and will be used as an initial reference for the detection means 3,5,7 and the optical means 9 as concerns the determination of both the orientation information and the planar information of the device 1.

The three-dimensional scanning process can be started and stopped by using suitable control means, in particular push-buttons, keys or the like, provided on the device 1 itself.

The method according to the invention can be implemented by means of a computer product which can be loaded into a memory of the device 1 or of the processing means 11, and which comprises software code portions adapted to implement said method.

The features of the present invention, as well as the advantages thereof, are apparent from the above description.

A first advantage offered by the device, system and method according to the present invention is that the whole shape of the object is acquired without any further operations for merging the single measurements.

A second advantage offered by the device, system and method according to the present invention is that a three-dimensional scanning of an object can be carried out directly on the spot where the object itself is located.

A third advantage offered by the device, system and method according to the present invention is that they are not dependent on the positions and quantity of references, or markers, present on the object under examination, thus remaining independent of the accuracy of measurement of such references.

A further advantage offered by the device, system and method according to the present invention is that the effects of noise and drift on the position measurements are reduced, leading to a better approximation of the three-dimensional image.

The three-dimensional scanning device, system and method may be subject to many possible variations without departing from the novelty spirit of the inventive idea; it is also clear that in the practical implementation of the invention the illustrated details may have different shapes or be replaced with other technically equivalent elements.

According to one possible alternative, for example, the device 1 is an intelligent mobile terminal e.g., a Smartphone, which implements the method of the present invention. The intelligent mobile terminals available today, and certainly also those available in the future, include detection means such as accelerometers, compasses, magnetometers, gyroscopes and the like. They are also equipped with a camera, which can be used as an optical means for measuring the position of the device 1 on the first reference plane. Finally, said intelligent mobile terminals have high computation and storage capacity allowing them to easily process the data of the above-mentioned sensors, so as to obtain a 3D image of the object being detected by following the method of the present invention.

In this latter case, there is also the possibility of displaying the 3D image of the object directly on the screen of the intelligent mobile terminal, without having to send any data to external display means.

It can therefore be easily understood that the present invention is not limited to a three-dimensional scanning device, system and method, but may be subject to many modifications, improvements or replacements of equivalent parts and elements without departing from the novelty spirit of the inventive idea, as clearly specified in the following claims.

The invention claimed is:

1. A device for three-dimensional scanning of an object, said device comprising:
   a spatial orientation detector configured to obtain orientation information of said device;
   an electro-optical assembly configured to obtain planar information about a position of said device in a first reference plane of said electro-optical assembly;
   a processor configured to acquire said orientation information from said spatial orientation detector and said planar information from said electro-optical assembly and to process said orientation information and said planar information in order to obtain an estimate of a position of said device on an axis substantially perpendicular to said first reference plane in order to obtain a three-dimensional image of said object.

2. The device according to claim 1, wherein said spatial orientation detector comprises at least one inertial sensor, including a gyroscope having three orthogonal sensitivity axes and/or an accelerometer having three orthogonal sensitivity axes.

3. The device according to claim 1, wherein said spatial orientation means comprises a magnetometric sensor.

4. The device according to claim 3, wherein the magnetometric sensor comprises a magnetometer having three orthogonal sensitivity axes.

5. The device according to claim 1, wherein said electro-optical assembly comprises an optical sensor.

6. The device according to claim 5, wherein said optical sensor comprises a LED, or Light Emitting Diode, or a camera.

7. The device according to claim 1, wherein said device comprises a transmitter.

8. The device according to claim 7, said device being connectable, via said transmitter, to a display that displays said three-dimensional image of said object.

9. The device according to claim 8, wherein said spatial orientation detector, said electro-optical assembly, said processor, said transmitter and said display are comprised in a single device.

10. The device according to claim 7, wherein said transmitter is of the wireless or wired type, adapted to transmit data relating to said three-dimensional image.

11. The device according to claim 1, wherein said spatial orientation detector and said optical sensor comprise a storage adapted to store data relating to said orientation information and said planar information.

12. The device according to claim 1, wherein said device is of the manual type.

13. The device according to claim 1, wherein said device is an intelligent mobile terminal.

14. A system for three-dimensional scanning of an object, said system comprising:
   a device comprising a spatial orientation detector and an electro-optical assembly;
   a processor adapted to acquire and process orientation information from said spatial orientation detector and planar information from said electro-optical assembly in order to obtain a three-dimensional image of said object;
   a display configured to display said three-dimensional image of said object.

15. A method of three-dimensional scanning of an object, said method comprising the steps of:
   obtaining, through a spatial orientation detector, orientation information of a device;
   obtaining, through an electro-optical assembly, planar information about a position of said device in a first reference plane of said electro-optical assembly;
   acquiring, through a processor associated with a storage, said orientation information from said spatial orientation detector—and said planar information from said electro-optical assembly;
   processing, through said processor, said orientation information and said planar information in order to obtain an estimate of a position of said device on an axis substantially perpendicular to said first reference plane in order to obtain a three-dimensional image of said object.

16. The method according to claim 15, further comprising defining operating characteristics of said spatial orientation detector and said electro-optical assembly.

17. The method according to claim 15, wherein said processing further includes estimating, through said processor at least one value of a quaternion, representative of said orientation information, by using a least square method.

18. The method according to claim 17, further comprising filtering, through said processor, said estimate of said at least one value of a quaternion and/or at least one quaternion deriving from a measurement of said orientation information from a gyroscope by using a recursive.

19. The method according to claim 18, wherein a result of said filtering is represented by a DCM matrix, or direction cosine matrix.

20. The method according to claim 19, further comprising multiplying, through said processor, a data vector of said planar information by said DCM matrix in order to obtain said three-dimensional image of said object.

21. The method according to claim 15, further comprising aligning at least one second reference plane of said spatial orientation detector with said first reference plane of said electro-optical assembly optical means.

22. The method according to claim 21, wherein aligning at least one second reference plane with respect to said first reference plane of said electro-optical assembly provides for:
  acquiring, through said processor, data supplied by said detection means when said device is rotated at least once about an axis substantially perpendicular to said first reference plane of said optical means;
  identifying, through said processor, said at least one second reference plane that contains a circumference obtained through said at least one rotation, said circumference being defined for each spatial orientation detector;
  identifying, through said processor, rotation matrices representative of roll and pitch angles of said device, which allow said at least one second reference plane for each spatial orientation detector to be aligned with respect to said first reference plane of said electro-optical assembly.

23. The method according to claim 15, wherein said method further comprises calibrating and compensating for any distortion/non-linearity.

24. The method according to claim 23, wherein calibrating and compensating for any distortion/non-linearity comprises:
  acquiring, through said processor, data supplied by said spatial orientation detector when said device is rotated;
  determining, through said processor, a three-dimensional solid which best approximates a three-dimensional distribution of said data sampled for said spatial orientation detector;
  analyzing, through said processor, said three-dimensional solid in order to find constituent parameters thereof;
  correcting, through said processor, raw data acquired by said spatial orientation detector in order to eliminate any non-linearity or distortion.

25. The method according to claim 24, wherein said correction of said raw data comprises:
  correcting an offset relative to said coordinates of the center of said ellipsoid;
  multiplying a sample of said raw data by said rotation matrix;
  normalizing, or correcting, each sample by dividing each component, in particular a value of Cartesian or polar coordinates, of said sample by said length of the respective reference half-axis in accordance with a first formula, in order to obtain a normalized sample;
  restoring an initial orientation of said normalized sample by multiplying it by the inverse of said rotation matrix.

26. A computer product which can be loaded into a memory of said device or of said processor, comprising portions of software code adapted to implement the method according to claim 15.

27. The method according to claim 15, wherein said orientation information comprises data relating to a roll, a pitch and a yaw of said device.

28. The method according to claim 15, wherein said planar information comprises data relating to a position of said device in said first reference plane of said electro-optical assembly.

* * * * *